United States Patent [19]

Hartmann et al.

[11] Patent Number: 5,810,427
[45] Date of Patent: Sep. 22, 1998

[54] MOTOR VEHICLE

[76] Inventors: Albrecht Hartmann, Schneeglöckchen Str. 85a, 80995 München, Germany; Jörg R. Bauer, Gablerstr. 4, 88250 Weingarten, Germany

[21] Appl. No.: 923,491

[22] Filed: Sep. 4, 1997

Related U.S. Application Data

[63] Continuation of Ser. No. 586,890, filed as PCT/EP94/01612, May 18, 1994, published as WO95/31355, Nov. 23, 1995, abandoned.

[51] Int. Cl.$^6$ ............................. B60R 19/40; B60R 21/00
[52] U.S. Cl. ..................... 296/189; 296/68.1; 293/118; 293/133; 293/119; 280/742
[58] Field of Search ..................... 293/107, 110, 293/133, 118, 119; 296/188, 189, 68.1; 280/729, 742

[56] References Cited

U.S. PATENT DOCUMENTS 4,116,482  9/1978  Spiegel ................. 296/180.3

FOREIGN PATENT DOCUMENTS

| 0582100 | 2/1994 | European Pat. Off. . | |
|---|---|---|---|
| 2153941 | 5/1972 | Germany . | |
| 2100817 | 7/1972 | Germany | 296/185 |
| 4239120 | 5/1994 | Germany . | |
| 4243186 | 6/1994 | Germany . | |
| 9400940 | 8/1994 | Germany . | |
| 9209456 | 6/1992 | WIPO | 293/119 |

*Primary Examiner*—Dennis H. Pedder
*Attorney, Agent, or Firm*—Robert W. Becker & Associates

[57] ABSTRACT

A motor vehicle has a rigid vehicle body structure with a compartment for passengers and payload. The vehicle body structure has a front, a back, and sides. An exterior skin is connected to the vehicle body structure and includes a plurality of aerial exterior skin portions. At least one impact protection unit is connected to the vehicle body structure and one of the aerial exterior skin portions for moving the one exterior skin portion from a retracted position at the vehicle body structure into an extended position in which a base surface area defined by the outer contour of the motor vehicle is enlarged. The impact protection unit upon impact reduces a deceleration of the compartment due to a movement of the impact protection unit toward the vehicle body structure.

16 Claims, 9 Drawing Sheets

MOTOR VEHICLE

This application is a continuation application of Ser. No. 08/586,890 filed Mar. 18, 1996, now abandoned which was the National Stage of International Application No. PCT/EP94/01612, filed May 18, 1994 published as WO95/31355 Nov. 23, 1995.

BACKGROUND OF THE INVENTION

The present invention relates to a motor vehicle with a rigid vehicle body structure having a compartment for passengers and payload and being enclosed by exterior skin portions. At least one impact protection unit is connected to the vehicle body structure and is moveable from a retracted position at the vehicle body structure into an extended position in which a base surface area defined by the outer contour of the motor vehicle is enlarged. The impact protection unit upon impact reduces a deceleration of the compartment due to a movement of the impact protection unit toward the vehicle body structure.

An important safety feature of modern motor vehicles are the so-called collapsible zones which are present especially at the front and end of the rigidly embodied passenger compartment. These collapsible zones are designed such that in case of an accident they deform in a predetermined manner so that the very sudden deceleration to which, for example, the forward bumper is subjected in the case of a frontal impact is transformed into a softer deceleration of the compartment which increases the survival chances of the passengers.

In view of the high traffic density and especially in view of the parking problems in densely populated areas a compact design of motor vehicles is a more and more important goal in vehicle construction. For such compact vehicles in which the base surface area that the vehicle requires is essentially only slightly greater than the usable base area of the usable space, the problem results that for the collapsible zones only an extremely limited space is available. This is disadvantageous with respect to the safety of passengers in compact vehicles.

There are numerous proposals to solve the goal of high safety by means of collapsible zones for a compact design of vehicles, for example, by providing that the forward bumper can be extended when the vehicle is in motion and can be retracted when the vehicle is stopped. With a corresponding design of the bumper itself and of its telescopic mechanism it is achieved that the extended bumper together with the telescopic mechanism provides for a collapsible zone which in case of an accident absorbs energy and slows the deceleration of the compartment. Still, the required parking space for the vehicle is very small due to the retractable bumper.

The known constructions have the following idiosyncrasies:

They are dangerous for pedestrians because they impact a pedestrian only at the level of the bumper in the area of the pedestrian's knee which results in a great risk of injury. Additionally, a pedestrian hit by the vehicle will be thrown onto the vehicle upon impact in an extremely dangerous manner.

An impacting vehicle can drive over the extended bumper so that the extended bumper is ineffective as a collapsible zone.

It is an object of the invention to provide a motor vehicle of the aforementioned kind with increased accident safety.

SUMMARY OF THE INVENTION

A motor vehicle comprising:
a rigid vehicle body structure comprising a compartment for passengers and payload, the vehicle body structure having a front, a back, and sides;
an exterior skin connected to the vehicle body structure, the exterior skin comprised of a plurality of aerial exterior skin portions;
at least one impact protection unit connected to the vehicle body structure and one of the aerial exterior skin portions for moving the one exterior skin portion from a retracted position at the vehicle body structure into an extended position in which a base surface area defined by an outer contour of the motor vehicle is enlarged; and
wherein the impact protection unit upon impact lowers a deceleration of the compartment due to a movement of the impact protection unit toward the vehicle body structure.

In the retracted position the base surface area of the motor vehicle is substantially identical to a floor area of the compartment.

The one aerial exterior skin portion preferably includes a front bumper and at least a major portion of the exterior skin extending from the bumper to a lower edge of a windshield of the motor vehicle.

The one aerial exterior skin portion may be an exterior door panel.

The one aerial exterior skin portion may be an exterior side panel.

The one aerial exterior skin portion preferably includes at least a portion of a rear panel of the exterior skin.

The impact protection unit comprises support elements, deformable at predetermined locations thereof and arranged in two planes, wherein the one aerial exterior skin portion in the extended position is supported with the support elements at the vehicle body structure.

The support elements are expediently arranged in an upper and a lower plane and the support elements in the upper plane are moveable stays connected to a stiff part of the vehicle body structure.

At least some of the support elements in the extended position extend substantially in a direction of force transmission resulting from an impact.

The one aerial exterior skin portion is advantageously guided so as to be linearly moveable in the lower plane and the support elements of the upper plane are passively moved from the retracted position to the extended position by a movement of the one aerial exterior skin portion.

The impact protection unit preferably comprises a first air bag positioned between the one aerial exterior skin portion and the vehicle body structure, wherein the first air bag compensates at least a portion of an impact energy.

The impact protection unit may comprise a second air bag arranged inside the compartment and connected to the first air bag, wherein upon impact air from the first air bag is transferred to the second air bag.

A means for inflating and deflating the first air bag may be provided, wherein the one aerial exterior skin portion is moved to the extended position by inflating the first air bag and returned into the retracted position be deflating the first air bag.

The pressure within the first air bag, when inflated, is preferably adjustable.

The first air bag advantageously comprises a plurality of air chambers each having a valve connected thereto, wherein each one of the valves responds to a different opening pressure.

The means for inflating and deflating preferably comprises a pressure source and the air chambers are connected with the valves to the pressure source, wherein the pressure source comprises a pressure control device for controlling the valves.

The one aerial exterior skin portion has a peripheral flange and the vehicle body structure has a matching flange cooperating with the peripheral flange such that in the retracted position the peripheral flange overlaps the matching flange.

The vehicle body structure is expediently comprised of:
- a driven base module including a drive unit and having an upper side forming a floor area of the compartment, the driven base module further including a roll bar;
- at least one impact protection module at a front end of the driven base module comprising the impact protection unit; and
- a superstructure module connected to the driven base module.

In another embodiment, a seat positioned in the compartment may be provided, wherein the seat comprises an elastic device connected to the seat for biasing the seat into a rearward position. The seat, upon frontal impact on an obstacle, is displaced by a preset travel path in a forward direction against the force of the elastic device.

The seat may comprise a seat belt that allows forward movement of a person seated in the seat by a preset travel path upon impact.

Due to the inventive embodiment of the motor vehicle it is achieved that the risk of injury especially for pedestrians is considerably reduced because the aerial exterior skin portion engages a pedestrian with a large surface area and will not throw him. Furthermore, the extended aerial exterior skin portion cannot easily be driven over by the bumper of the impacting vehicle so that the collapsible zone formed by the extended aerial exterior skin portion is reliable in its function. Furthermore, additional material for energy compensation is provided.

With the features of the base surface of the usable space being substantially identical to the base surface area of the motor vehicle when the exterior skin portion is in its retracted position it is achieved that for the maximum usable space only a minimum parking space is required.

In a very advantageous embodiment of the motor vehicle in which the aerial exterior skin portion, together with the forward bumper, forms a kind of protective shield in front of the vehicle.

With the feature of the aerial exterior skin portion being the outer portion of a vehicle side door or a car body side panel, the safety of the passengers during accidents involving lateral impact is increased.

In another embodiment in which the aerial exterior skin portion forms at least a part of the rearward end of the car body structure increased safety is achieved also with respect to a rear impact which is especially important for compact vehicles in which behind the front passengers only little space is provided or also for van-type vehicles in which the rear loading space, for example, receives a child seat.

With the extendable aerial exterior skin portion in the extended position being supported at least in two planes with directly deformable support elements at the car body structure, it is achieved that the deformation energy to be absorbed during an accident has sufficient material, respectively, constructive elements at its disposal with which, on the one hand, the constructive design is facilitated and, on the other hand, the safety of the passengers is improved.

Especially simple, but very effective embodiments of the deformable support elements, respectively, stays are provided when the support elements in the upper plane are formed by moveable stays which support the aerial exterior skin portion in its extended position at a stiff car body part, when at least some of the support elements in the extended position of the aerial exterior skin portion extend substantially in the direction of the force flow resulting upon impact on an obstacle, or when the aerial exterior skin portion is movably guided in a lower plane linearly relative to the vehicle and the moveable stays of the upper plane are passively moved from their rest position into the active position by the movement of the aerial exterior skin portion.

By providing between the aerial exterior skin portion and the car body an air bag which absorbs at least a portion of the impact energy, the surface of the aerial, extendable exterior skin portion is used in an especially effective manner whereby a correspondingly constructed air bag is additionally very advantageous with respect to weight considerations and is able to absorb a large amount of energy.

By connecting at least one additional air bag in the interior of the vehicle to the exterior air bag such that the at least one interior air bag is inflated by the air leaving the exterior air bag, the safety of the passengers is additionally increased because the air bag arranged within the passenger compartment prevents impact of a passenger onto hard structures of the compartment. This additional air bag is very cost-efficient because it does not require its own release or inflating mechanism. It is possible to arrange a plurality of air bags, for example, at the upper longitudinal support, the door frames, the steering wheel, the dash board in front of the front passenger etc.

The extension, respectively, retraction of the aerial exterior skin portion can be effected by loading the exterior air bag with pressure or vacuum. Thus, the air bag is not only used for energy absorption during an accident, but in addition also for the movement of the aerial exterior skin portion.

Preferably, the pressure of the gas contained within the exterior air bag can be varied in the extended position of the aerial exterior skin portion. Thus, the force-distance characteristic line, respectively, the energy absorption capability of the collapsible zone can be adapted to the respective requirements, for example, the velocity of the vehicle or the degree of loading of the vehicle. Especially upon impact onto a rigid obstacle it is advantageous when the gas pressure within the air bag for a vehicle which is only minimally loaded is less than for a vehicle which is heavily loaded so that the collapsible zone comprising the air bag and the aerial exterior skin portion are deformable in a sufficiently soft manner.

Advantageously, the exterior air bag is comprised of a plurality of chambers provided with valves each opening at a different pressure. Thus, the force-distance characteristic line of the collapsible zone can be adapted to the respective requirements by selecting the chambers and valves. Expediently, the air chambers are connected via valves to a pressure source and a pressure control device is provided for controlling the valves. Thus, an exact defined filling of the individual chambers of the air bag with a respective gas volume is possible. When the pressure source is a pressure storage means, the gas required for inflating the air bag can be simply pumped back and forth between the air bag and the storage means. This saves expenditures for air drying when the gas is ambient air. Optionally, a portion of the gas can be stored within the interior air bag when the exterior air bag is not inflated.

By providing the aerial exterior skin portion with a peripheral flange which in the retracted position of the aerial exterior skin portion overlaps a corresponding flange of the car body, it is achieved that the mechanism for extending and retracting the aerial exterior skin portion, respectively, an air bag provided thereat is effectively protected against soiling.

By providing a modular construction including a driveable base module which at its upper side provides the usable surface area of the motor vehicle, has a drive unit with corresponding supply devices, and comprises a roll bar, further including at least one impact protection module in the form of an extendable aerial exterior skin portion at the front end of the base module, the impact protection module comprising the front bumper and at least the greater portion of a part forming the front end of the vehicle extending from the bumper to the lower edge of the windshield, and also including a superstructure module to be placed onto the base module, defines an embodiment of the motor vehicle which can be inexpensively constructed as a compact vehicle for different applications and which, at the same time, provides for great safety is realized. The impact protection module can be provided as a completely independent unit adapted to the respective requirements and the allowable cost limits.

In an especially advantageous embodiment of the vehicle, a seat is connected to the rigid car body structure within the usable space which is forced by a yielding device (spring) into its rearward position and, upon impact of the motor vehicle onto a front obstacle, is displaceable forwardly by a certain travel path. Thus, in addition to the extendable exterior skin portion providing the deceleration path, a travel path is used for increasing the safety of a passenger by which path the seat is moved forward during an accident without endangering the passengers seated thereon.

With the feature of connecting to the vehicle seat a safety belt that releases by a certain travel path a person seated in the vehicle seat upon impact on an obstacle, a directed yielding of the safety belt for decelerating the passenger is used additionally.

With the features of a seat connected to the rigid car body structure that upon impact of the motor vehicle onto a front obstacle is displaceable forwardly by a certain travel path and a safety belt that releases by a certain travel path a person seated in the vehicle seat upon impact, a protective shield may be dispensed with when a sufficiently long deceleration path is provided.

BRIEF DESCRIPTION OF THE DRAWINGS

In the following the invention will now be disclosed in further detail with the aid of schematic drawings for exemplary embodiments.

It is shown in:

FIGS. 2a and 2b detail of a forward protective shield in the extended (a)) and retracted (b)) position, FIGS. 3a and 3b embodiment of the protective shield according to FIG. 2a and 2b provided with an air bag, FIG. 3c a schematic representation of an air bag comprising multiple air chambers each having a valve connected thereto and the valves connected to a pressure source having a pressure control device;

FIGS. 4a–4c the sequence of events upon impact of a vehicle according to FIGS. 3a, 3b onto an obstacle in a schematic representation, FIG. 5a–5c different embodiments of a mechanism for extending an aerial exterior skin portion, FIGS. 6a and 6b sectional views of a vehicle door provided with extendable exterior skin portion, FIG. 7 a sectional view of a rear hatch provided with an extendable exterior skin portion and FIGS. 8a and 8b a compact vehicle constructed in a modular design.

DESCRIPTION OF THE PREFERRED EMBODIMENTS

Figure 1:
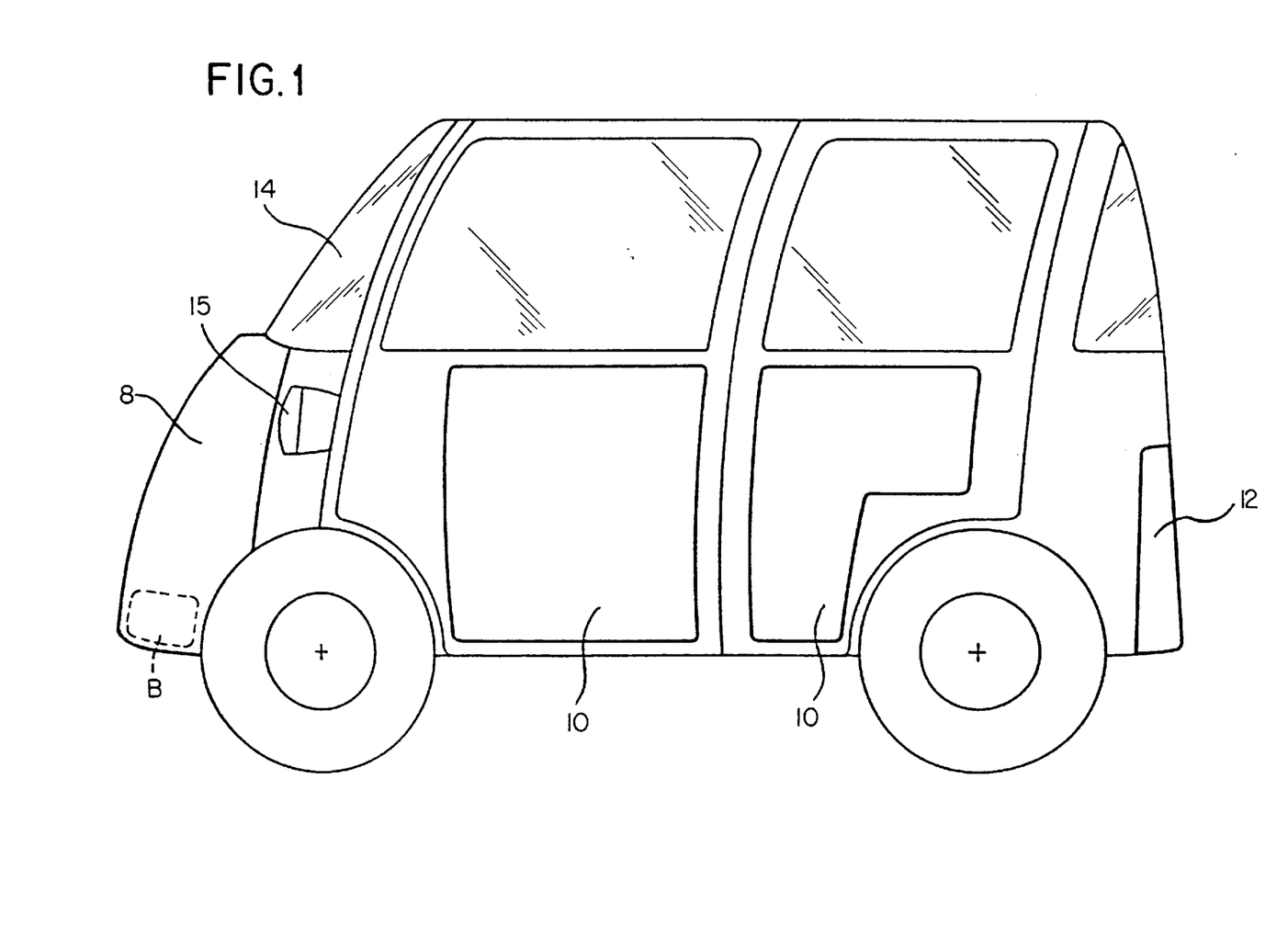
FIG. 1 a side view of a compact vehicle.
Figure 8A:
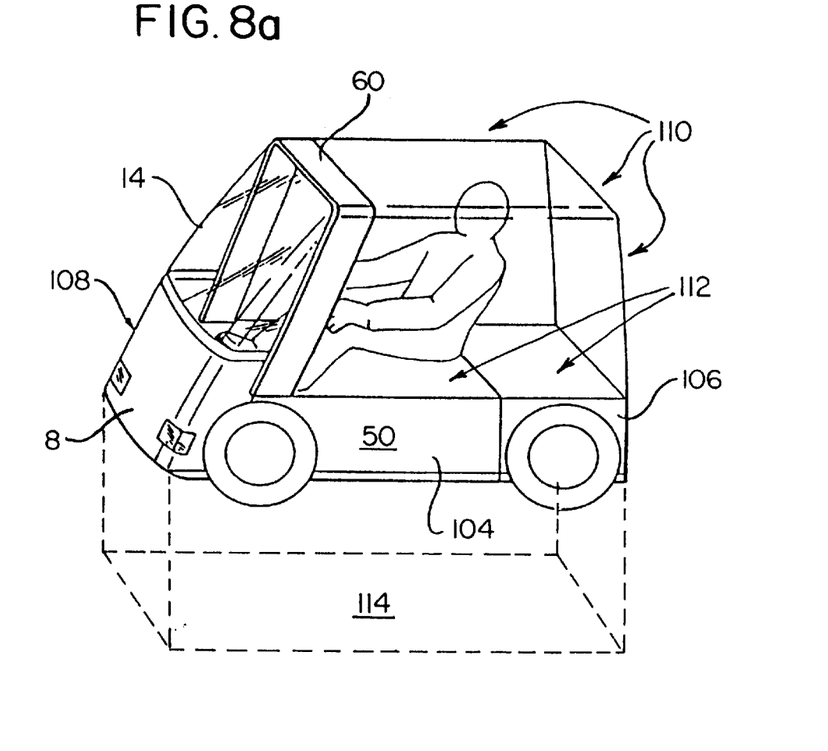

FIG. 1 shows a side view of a compact vehicle that differs from conventional vehicles especially in that its base surface area corresponds substantially to the usable area. (FIG. 8a shows the vehicle schematically, illustrating the floor or usable area 112 as well as the base surface area 114.) This, for example, can be achieved by an underslung construction in which all essential components are positioned below the inner compartment, respectively, usable space of the vehicle. Furthermore, the passengers are seated in a substantially upright position so that the vehicle in comparison to conventional vehicles is tall and short. With this construction, but also with the conventional construction of vehicles which is directed to providing a small base surface area, the sizes of collapsible zones exterior to the passenger compartment, respectively, usable space are extremely limited. Such collapsible, respectively, deformation zones are necessary for decelerating the passengers to such a degree in the case of an impact that a chance of survival is provided, respectively, the severity of the injuries is correspondingly reduced. For this purpose, the vehicle at its front end, respectively, optionally at the side doors in the areas below the windows as well as within the rear are provided with extendable, aerial exterior skin portions 8, 10, and 12.

At the front of the vehicle the extendable, aerial exterior skin portion comprises advantageously the bumper B with its skirts and extends to the lower edge of the windshield 14 so that this skin portion essentially forms a protective shield. Depending on the constructive embodiment and design the vehicle headlights 15 with integrated turn signals are also held at the protective shield 8 or connected to a fixed part of the car body.

In the area of the doors the extendable exterior skin portions 10 correspond to a large surface portion of the exterior skin of the doors, respectively, of the panels or encompass the entire respective parts.

At the rear, the aerial exterior skin portion 12 forms, similar to the protective shield 8 at the front, a rear shield that ends below a loading edge of the vehicle.

It is understood that depending on the constructive embodiment and requirements different shapes and sizes of the extendable aerial exterior skin portions are possible. Especially the laterally extendable exterior skin portions in the area of the lateral doors and in the case of two-door vehicles the lateral car body panels can be designed advantageously such that they contribute to the stylish appearance of the vehicle, for example, by providing a distinct recess, by integrating lateral or peripheral protective strips etc.

Figure 2A:
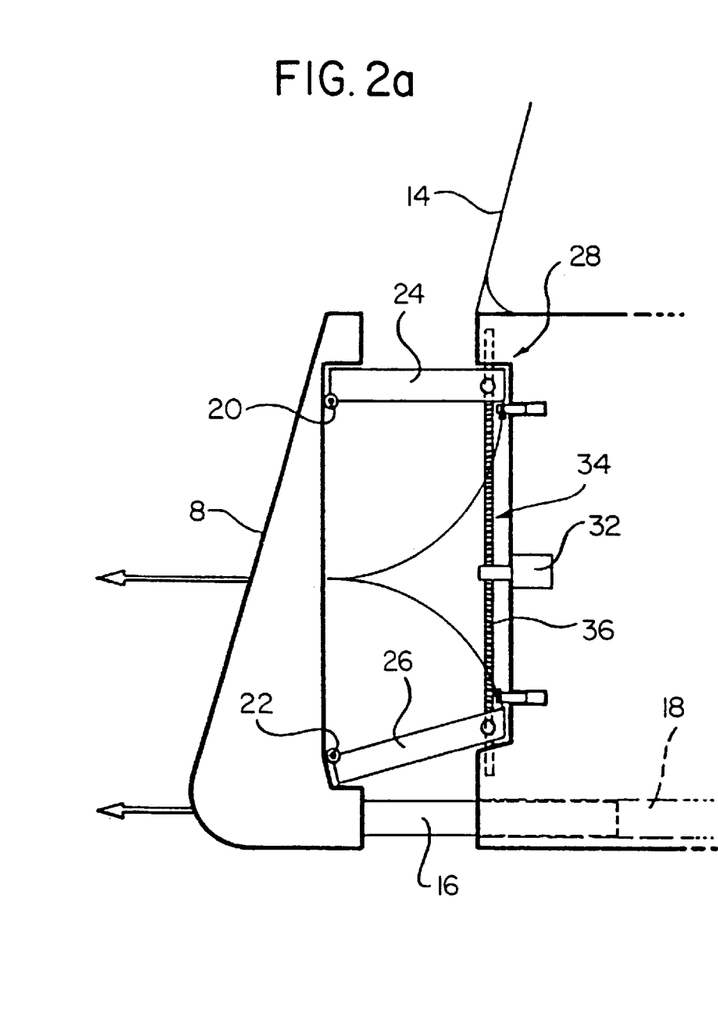
Figure 2B:
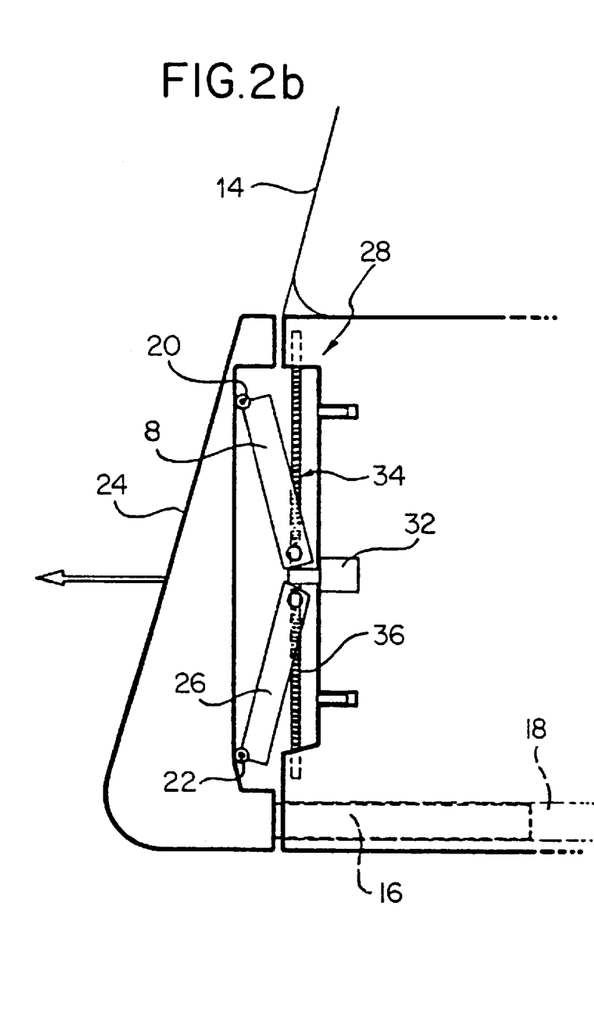

According to FIG. 2a the forward protective shield 8 is guided so as to be longitudinally displaceable with guide parts 16 in longitudinal supports 18 of the rigid car body structure. For movement of the protective shield 8 hydraulic cylinders are positioned within the longitudinal supports 18 which, when accordingly control, move the protective shield into its extended position (FIG. 2a) or into its retracted position (FIG. 2b).

The guide parts 16 are connected rigidly with a non-represented bumper positioned so as to be hidden under the protective shield 8 so that a stable understructure is provided. The bumper can be of a conventional design and therefore will not be described in detail. The skirt of the bumper is advantageously embodied as a unitary part of the large surface area protective shield 8 with the forward car body portion.

In order for the large surface area protective shield 8 to be stably guided, on the one hand, and optimally used for energy absorption in the case of an accident, on the other hand, stays 24, 26 are supported in upper bearings 20 and lower bearings 22 at the back side of the shield. In the area of the stiff forward car body structure 28 a spindle drive 34 of conventional design which is driven by an electric motor 32 is arranged whereby the threaded spindle 36 is in engagement with a respective upper and lower stay 24, 26.

In the position according to FIG. 2a the ends of the stays 24, 26 at the spindle are moved into a distal end position in which they are adjacent structures of the car body 28 so that they are stably supported in the case of a frontally acting force at the car body structure 28.

The bearings 20 and 22 are fastened to the inner frame of the protective shield 8.

Overall, the embodiment of the front end of the vehicle according to FIG. 2a, in which the protective shield 8 is, for example, extended by about 40 cm, represents an extremely effective collapsible zone. Upon collision with an obstacle positioned to the left of the front end of the vehicle according to FIG. 2a the impact forces are transmitted via the guide parts 16, the slightly slantedly positioned lower stays 26 and the optionally also slightly slantedly positioned upper stays 24 from the protective shield 8 into the car body structure 28. The stays 24 and 26 are, for example, in the form of slip-on tubes or folding bag supports so that they will deform in a directed manner during energy absorption. The non-represented hydraulic cylinders for movement of the guide parts 16 within the longitudinal supports 18 are constructed with pressure relief valves with variable cross-section, respectively, overflow openings such that upon a forced movement of the guide parts 16 within the longitudinal supports 18 energy is also absorbed in a defined manner.

The protective shield 8 has advantageously a somewhat yielding surface so that the severity of injuries in accidents with pedestrians is reduced.

FIG. 2b shows the spindle drive 34 in a position in which the stays 24 and 26 are retracted by the threaded spindle 36 so that the protective shield 8 is positioned in the retracted position flush with the vehicle body.

The control of the entire arrangement is advantageously such that the protective shield for a stopped, i.e., parked vehicle is retracted and is moved forward from the vehicle as soon as it drives faster than a defined velocity. Different activating principles are possible, for example, with sensors that sense the velocity, the running engine, closed vehicle doors, a person seated on the seat etc. Advantageously, the protective shield 8, respectively, the collapsible zone is activated always when the vehicle is not parked. The extension and retraction of the protective shield can also be controlled by the driver by pushing a button.

In a somewhat altered embodiment of the aforedescribed device it is sufficient to use for the extension and retraction only the electromotor(s) 32 so that the guide parts 16 are only passively displaced within the longitudinal stays 18. In this embodiment, the guide parts 16 are guided in the longitudinal supports 18 in hydraulic cylinders with variable overflow cross-sections so that upon impact a directed energy absorption takes place.

Alternatively, the extension and retraction of the protective shield 8 can also be carried out only via hydraulic cylinders between the guide parts 16 and the longitudinal supports 18 and the movement of the stays 24, 26 is passive by supporting the stays at the protective shield 8 or at the car body structure 28 so as to be guided at the respective other component for passive movement during extension and retraction of the protective shield in the guides.

In a less complicated embodiment, the protective shield 8 can be extended and retracted manually or by activation by foot.

Figure 3A:
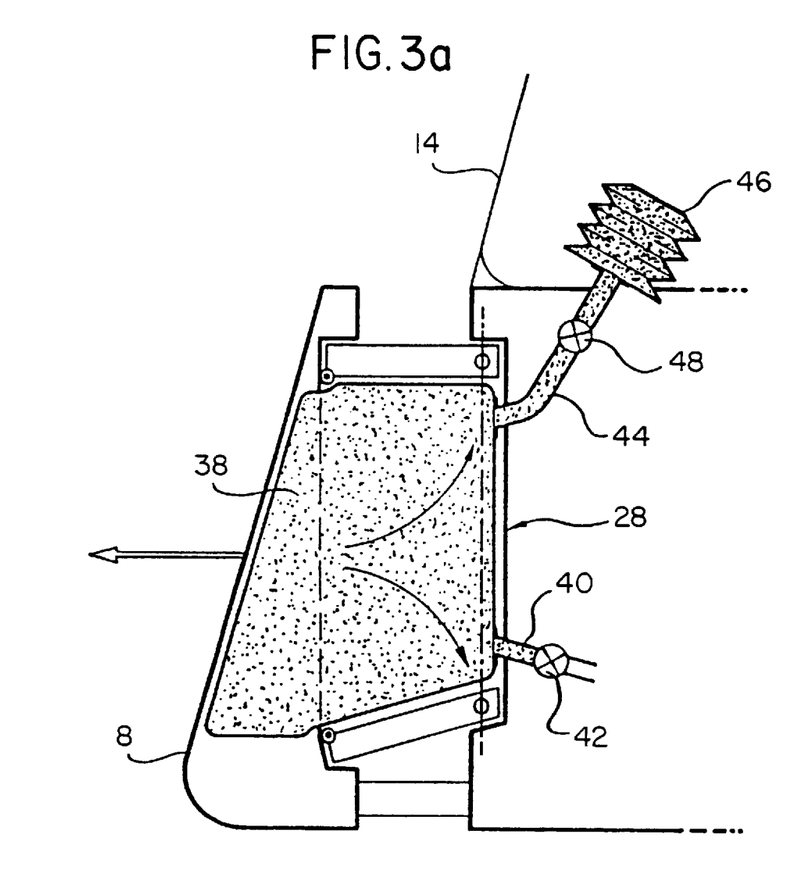
Figure 3B:
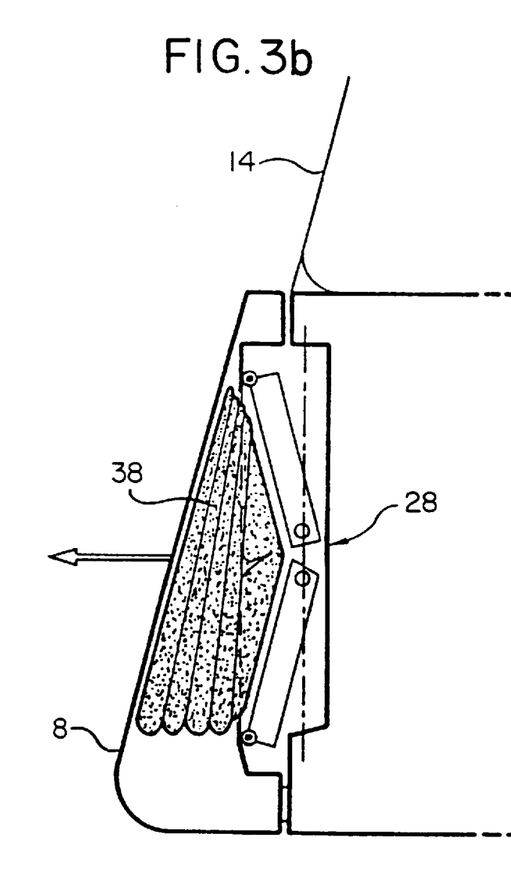

FIGS. 3a and 3b shows a further embodiment of the invention according to FIGS. 2a and 2b in which between the protective shield 8 and the car body structure 28 an air bag 38 is arranged. For inflating the air bag a line 40 with a valve 42 is provided. The air bag 38 is comprised advantageously of a plurality of non-represented chambers, are provided with pressure relief valves or in a directed manner with throttle openings and/or outlet openings which open upon surpassing a certain overpressure, so that the air bag 38 effectively contributes to energy absorption in the case of an accident.

Advantageously, the interior of the air bag 38 is connected via an overflow line 44 with an air bag 46 positioned in the interior of the vehicle which in the case of an accident inflates suddenly so that the air bag 38 due to the retraction of the protective shield 8 is reduced in size. This reduction in size is correlated with a volume change which is great relative to the volume of the air bag 46. This volume change upon a sufficiently high air pressure within the air bag 38 results in a fast flow of air and thus inflation of the air bag 46. Depending on the pressure present within the air bag 38 in the normal extended state of the protective shield 8, an electrically controlled valve 48 may be provided in the flow line 44 that, in case of an accident, opens the flow line 44. It is understood that a plurality of air bags can be provided at exposed locations within the inner compartment of the vehicle.

FIG. 3a shows the air bag 38 schematically in the retracted position of the protective shield 8.

Figure 3C:
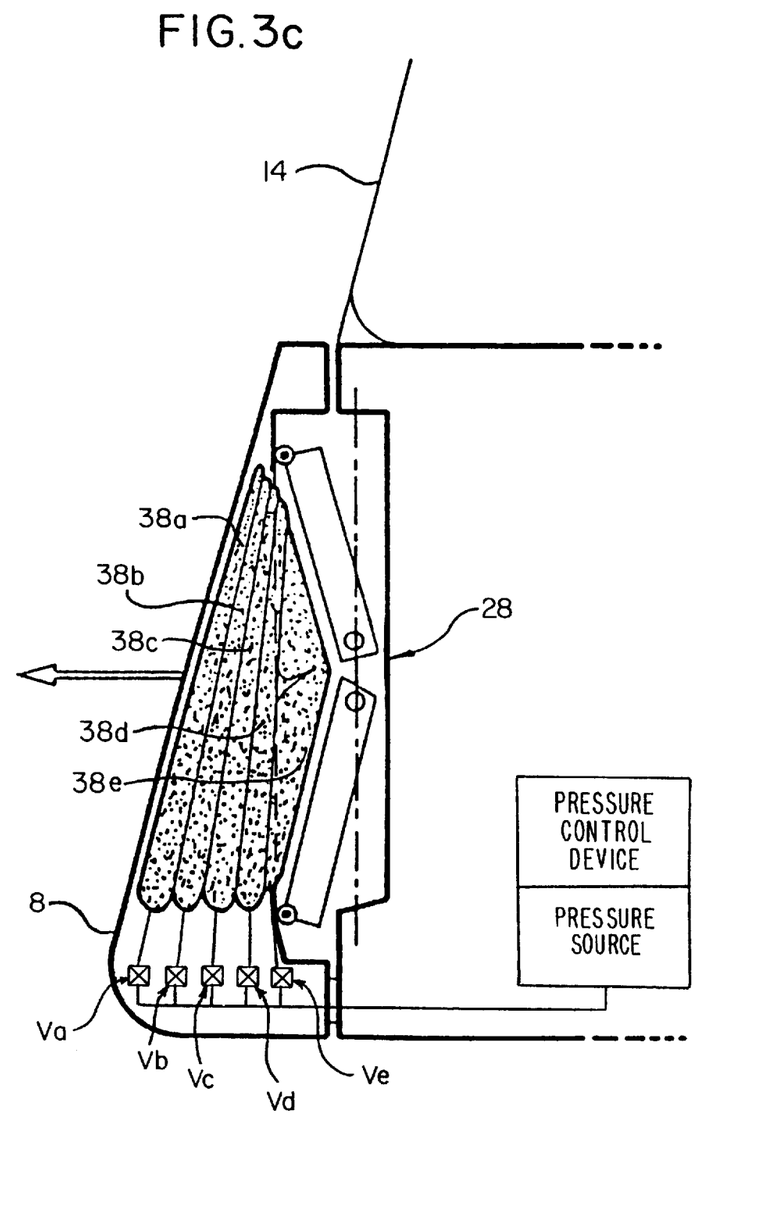

FIG. 3c shows an embodiment in which the air bag is comprised of a plurality of air chamber 38a–38e each having a valve Va–Ve connected thereto. Each valve Va-Ve responds to a different pressure. The valves Va–Ve are connected to a pressure source that comprises a pressure control device for controlling the valves Va–Ve.

Figure 4A:
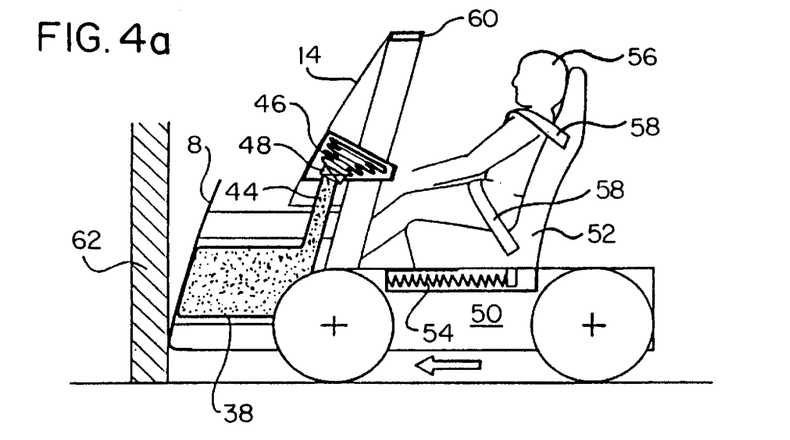
Figure 4B:
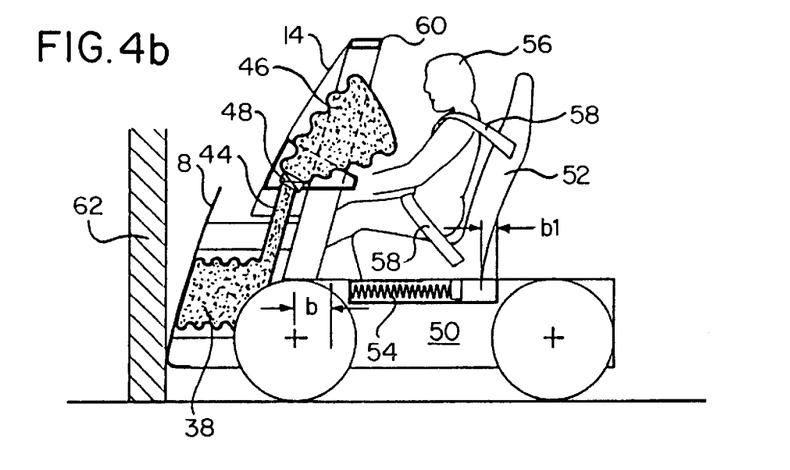
Figure 4C:
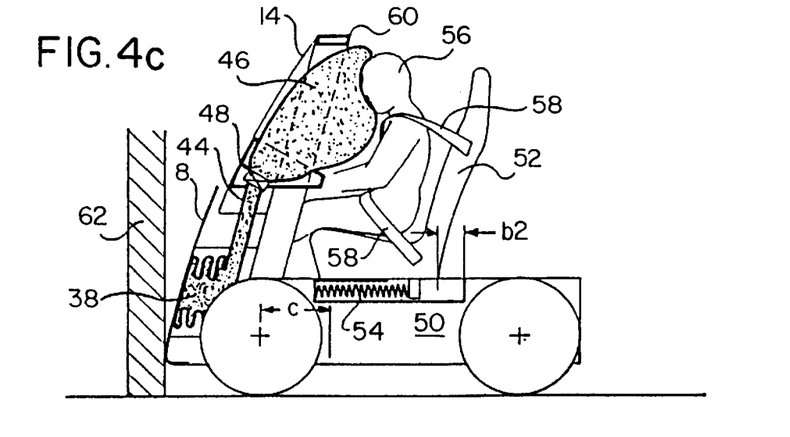

FIGS. 4a–4c shows the arrangement according to FIGS. 3a and 3b mounted within a compact vehicle whereby the air bag 46 is mounted on the steering wheel. The compact vehicle is represented with most car body parts removed and comprises a drivable base module 50 on which the protective shield 8 with the air bag 38 and the corresponding, non-represented guide, respectively, telescopic mechanism for the protective shield 8 is mounted. Within the base module 50 the drive unit of the vehicle, steering, pedal groups etc. are provided. Moreover, a drive seat 52 is represented which is stably secured at the base module with non-represented guides so as to be longitudinally displaceable. Normally, the seat 52 is in a rearward position into which it is biased by the force of a spring 54. Upon compression of the spring 54 resulting from a forward movement of the driver seat 52 relative to the base module 50 a non-represented dampening device in the form of a shock absorber becomes active which dampens this relative movement, transforms energy, and prevents back lash.

In the drive seat 52 an operator (driver) 56 is secured by the safety belt 58 which upon loading yields to a certain extent in a predetermined manner.

For the protection of the operator 56, respectively, the entire inner compartment of the vehicle, a self-supporting and stiff roll 60 is rigidly connected to the base module 50.

FIG. 4a shows a situation in which the vehicle, coming from the right, impacts on a rigid obstacle 62. The air bag 38 is filled to tautness with gas, the valve 48 is closed, and the air bag 46 is empty. The driver seat 52 is in its rearward position and the operator 56 is held in contact at the driver seat 52 by the safety belt 58.

In the situation according to FIG. 4b the vehicle has moved by the distance b to the left. The protective shield 8 has already moved by this distance toward the base module 50 so that the air bag 38 which is accordion-shaped has decreased in size. Due to the high pressure present within the flow line 44 the valve 48 has opened and the air bag 46 is already partially inflated. The driver seat 52 has been moved to the front by the distance $b_1$ counter to the force of the spring 54 and the fluid dampening action relative to the base module 50. Due to his inertia the operator 56 pulls strongly at the safety belt 58 which in a directed manner elongates to some extent and allows the operator 56 to gain a distance from the drive seat 52. In total, the distance by which the operator 56 has moved to the front is b plus $b_1$ and in addition the distance of the operator 56 from the driver seat 52. The sudden deceleration of the protective shield 8 has thus been transferred into a soft deceleration of the operator 56.

In the state c) the deformation path of the protective shield 8 is substantially completed because the vehicle has moved by the travel path c) in the direction of the obstacle 62. The air bag 46 is fully inflated. The operator 56 has been moved forwardly together with the seat by the distance $b_2$ relative to the base module 50 and is secured by the safety belt 58 at a distance from the drive seat 52. Additionally, the air bag 46 counters further movement of the operator 56 whereby the air bag primarily prevents a forward bending of the head.

Overall, with the disclosed arrangement it is achieved that even severe accidents can be safely survived.

Figure 5A:
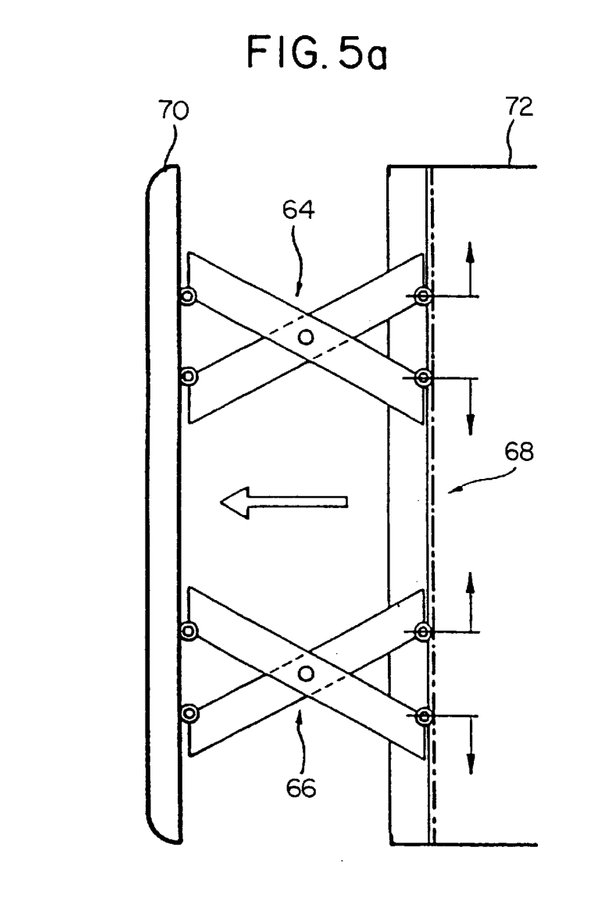

FIG. 5a shows a mechanism in which the stays 24 and 26 of FIG. 2 have been replaced by scissor-type mechanisms 64, 66 which are again driven by a spindle drive 68. The ends of the scissor-type mechanism 64, 66 positioned at opposite ends of the spindle drive 68 are guided in guides relative to the movable aerial exterior skin portion 70. Depending on the constructive design FIG. 5a represents a plan view (the scissor-type mechanisms 64 and 66 are positioned laterally adjacent to one another within a common plane) or a side view (the scissor-type mechanisms 64 and 66 are positioned above one another and formed two planes at different levels in which the exterior skin portion 70 is supported at the car body structure 72). The scissor-type mechanism according to FIG. 5a, on the one hand, stably secures the aerial exterior skin portion 70 and, on the other hand, serves to provide an effective energy absorption during deformation.

Figure 5B:
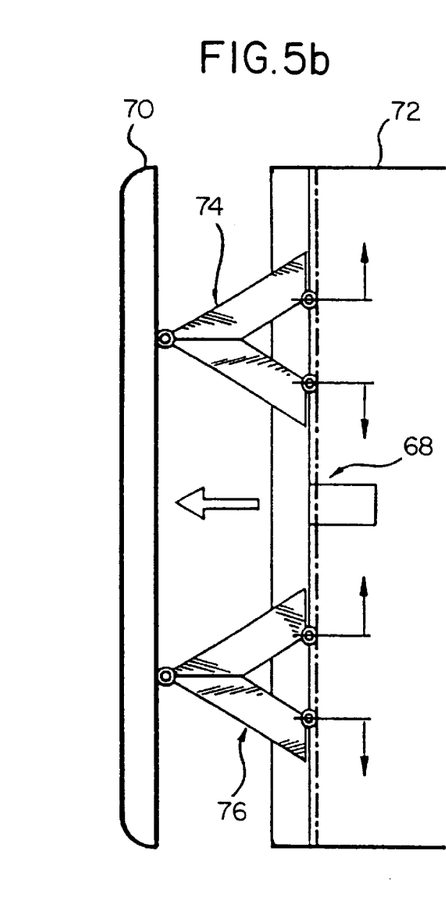
Figure 5C:
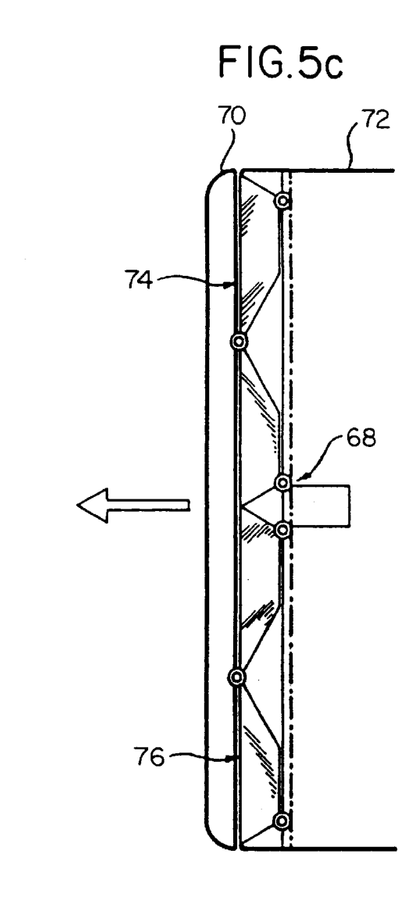

FIG. 5b shows a mechanism in which the scissor-type mechanisms 64 and 66 have been replaced by jointed stays 74, 76 connected with one side to the aerial exterior skin portion 70 and with the opposite ends cooperate with the spindle drive 68. FIG. 5c shows the exterior skin portion 70 in the retracted position flush with the car body.

Figure 6A:
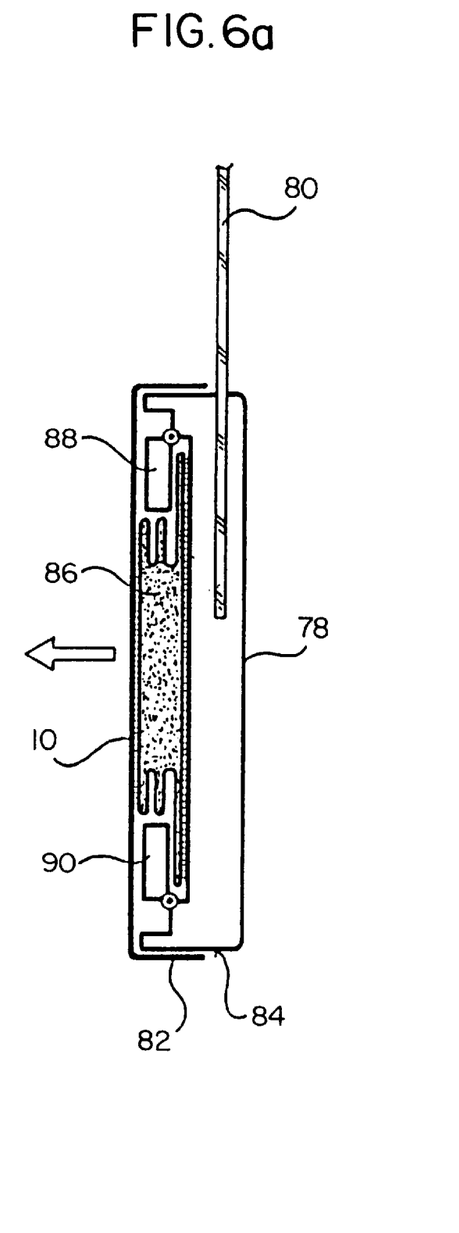
Figure 6B:
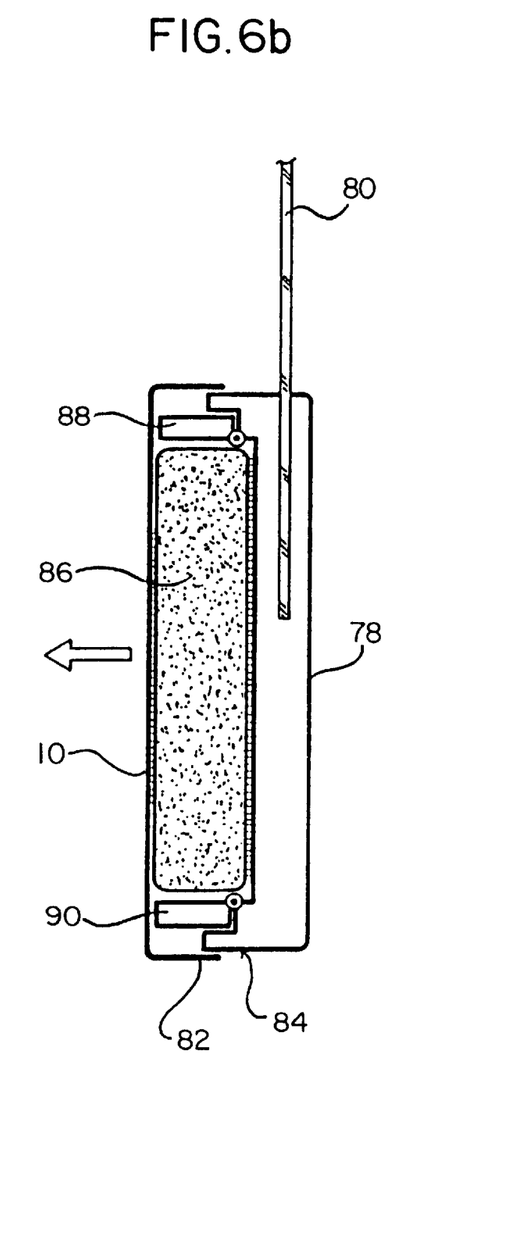

FIGS. 6a, 6b show the embodiment of a vehicle door with an exterior skin portion 10 that is extendable in order to increase the safety during side impact. The vehicle door comprises a door body 78 in which a side window 80 can be lowered. In a manner known per se the door body comprises an upper non-represented longitudinal support and is supported at the lower end on the highstability longitudinal beam of the vehicle. With a peripheral flange 82 which cooperates with the corresponding peripheral exterior surface 84 of the door body 78 as well as with optionally also present guides, the exterior skin portion 10 is movable relative to the door body 78. Between the door body 78 and the exterior skin portion 10 an air bag 86 is arranged the connectors of which are not represented. The air bag 86 is glued to the exterior skin portion 10 and the door body 78 so that the exterior skin portion 10 during inflation of the air bag 68 is moved into the extended position b) and upon loading with vacuum is retracted into its retracted position a). For a directed force introduction upon loading of the exterior skin portion 10 with a force from the left according to FIG. 5b, the door body 78 is provided at the upper and lower end with support elements 88, 90. This supporting action, for example, with springs surrounding the bearing axis, is such that the upper support elements 88 are elastically prestressed in the clockwise direction and that the support elements 90 are elastically prestressed in a counter-clockwise direction so that, upon extending the exterior skin portion 10 from the position of FIG. 5a, the support elements automatically are moved into the position according to FIG. 5b and, upon retraction, in the reverse direction.

It is understood that the exterior skin portion 10 is a rigid structure, for example, in the form of a ribbed sandwich structure which in the case of deformation can absorb energy.

The support elements 88 and 90 can be alternatively designed such that during inflation of the air bag 86 they are pushed by it into the active position and returned into the retracted position.

With the disclosed construction there is therefore provided a certain collapsible zone in the case of a lateral impact without increasing the thickness of the door, respectively, the width of the vehicle when parked. For side-by-side parked vehicles any additional centimeter of the thickness of the door, respectively, of the width of the vehicle is obstructive because of the opening of the door required for entering and leaving the vehicle.

Figure 7:
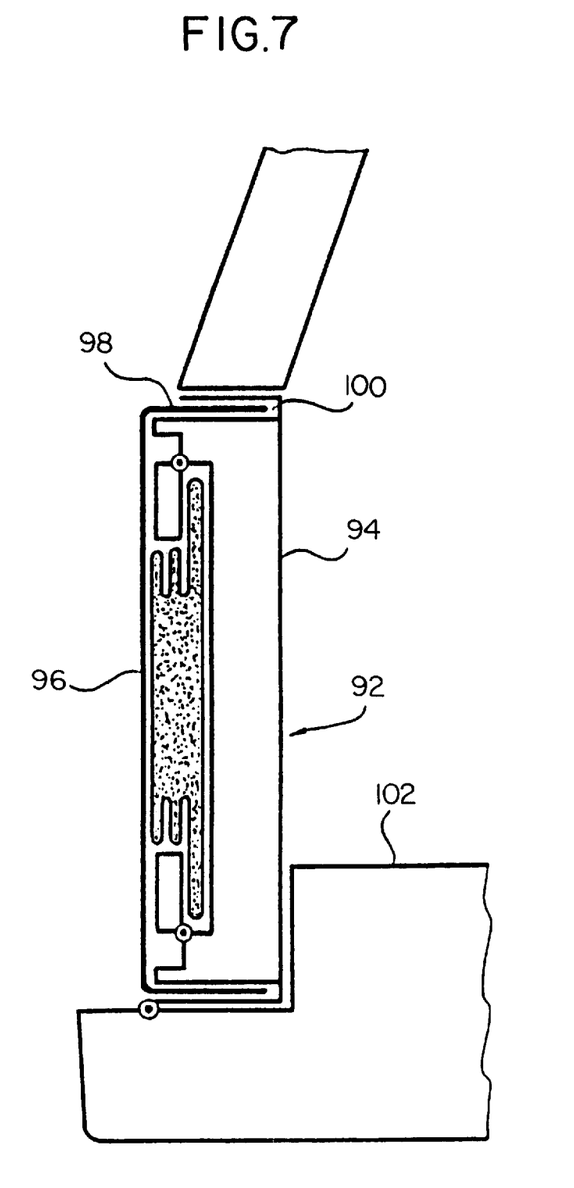

FIG. 7 shows an embodiment very similar to FIGS. 6a, 6b at the rear hatch of a vehicle. The rear hatch 92 comprises a hatch body 94 and an exterior skin portion 96 that engages with a peripheral flange 94 a corresponding peripheral groove 100 of the hatch body 94. The mechanism for extending the exterior skin portion 96 relative to the hatch body 94 corresponds to the arrangement according to FIGS. 6a, 6b so that it will not be explained here. In the extended position the exterior skin portion 96 is supported in the case of a force acting from behind (according to FIG. 7 from the left) at the longitudinal structure 102 of the car body structure due to the overlapping arrangement of the rear hatch 92.

The rear hatch 92 is pivotably supported at a horizontal axis at the longitudinal structure 102 so that according to FIG. 7 it can be opened counter-clockwise and provides simultaneously a shelf surface.

Alternatively, the rear hatch can also be laterally pivotable so that it is pivotable about a vertical axis.

It is understood that the rear end of the vehicle can be embodied in analogy to the front end of the vehicle so that the rear bumper together with the end portion of the rear car body forms a protective shield that can be extended to the rear.

This protective shield ends at the lower edge of the rear hatch. In such an embodiment, the loading edge of the vehicle is above the height of the bumper. However, with this embodiment an extremely safe embodiment of the rear of the vehicle is provided. The somewhat higher loading edge is acceptable because the rear end of the compact vehicle is very short.

The support of the extended aerial exterior skin portion at the car body structure via support elements, respectively, stays is advantageously such that the support elements, respectively, stays extend substantially in the direction of the flow of forces in which, upon collision, the impact forces are transferred from the exterior skin portion into the rigid car body structure.

Figure 8B:
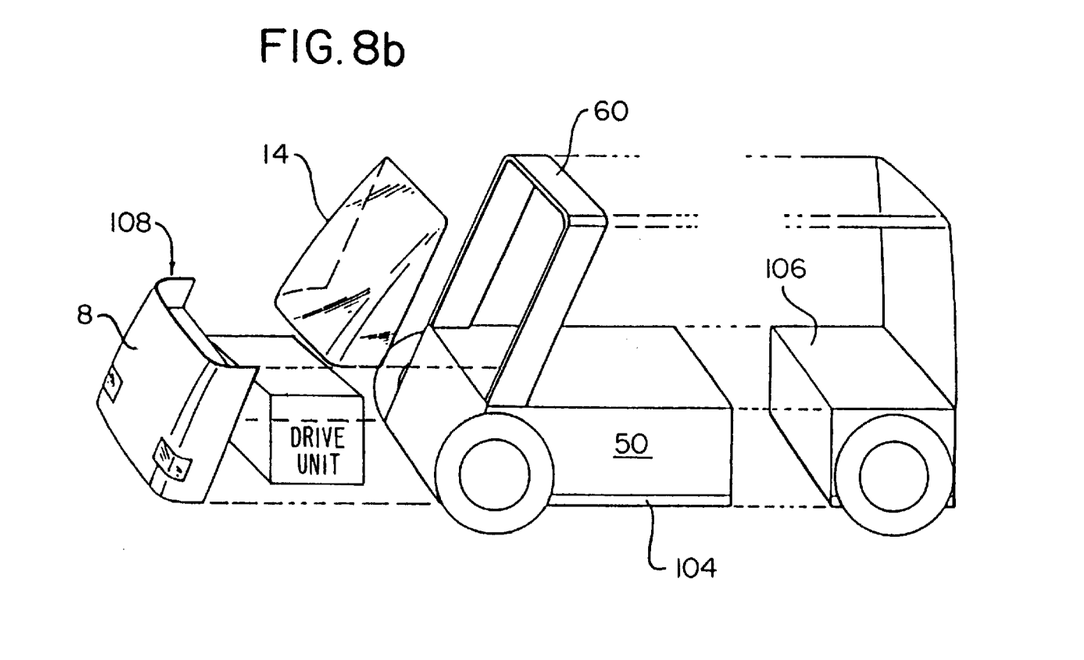

FIGS. 8a, 8b illustrates with a particular embodiment the module-type construction of the inventive vehicle, a) in the assembled state, and b) in an exploded view.

The base module 50 (FIGS. 4a–4c) comprises a front module 104 with front wheels, the steering mechanism, the foot pedal group, and the front seats as well as the roll bar 60. The rear module 106 comprises the rear wheels, rear axle, a coupling to the front module, for example, dove tail guides, etc. A supersturcture 110 encloses the vehicle compartment. Depending on the type of drive unit, (front wheel drive, rear wheel drive, electric motor, combustion engine, hybrid drive etc.) the drive unit is positioned at the front module and/or rear module. The windshield 14 is connected to the roll bar 60. Below the windshield 14 the front module 104 is provided with an impact protection module 108 comprising the protective shield 8. At the rear module 106 as well as within the side areas of the vehicle similar impact protection modules can be provided. Each impact protection module is advantageously designed such that it comprises a basic part mounted to the stable, non-deformable vehicle module which cooperates in a box-type manner with a corresponding extendable aerial exterior skin portion. Between the two parts the telescopic mechanism, for example in the form of a scissor-type mechanism with an additional air bag is arranged.

The air bag, as mentioned before, can be comprised of individual chambers connected to a gas source and positioned sequentially behind one another, with one chamber extending through the other, or parallel to one another. Depending on the embodiment of the connection between the individual air chambers they can be filled sequentially when arranged one after another, whereby between the chambers throttle openings or valves are provided that open upon surpassing a certain pressure. Additionally, each chamber can be provided, if necessary, with a pressure relief openings opening to the exterior. It is especially advantageous to arrange the chambers parallel to one another to one gas source whereby in each line a control valve is arranged which is controlled by an electronic control device. In this manner, the filling of the entire air bag and thus its deformation behavior can be adjusted to the respective requirements.

The impact protection modules can be embodied with a respective construction such that they are usable for different vehicles and can be retrofitted therein. Such impact protection modules, having a base structure connected the vehicle which supports the extendable exterior skin portion with the corresponding mechanism and the energy absorption device, can be used with wide range of vehicles, for example, cars, commercial vehicles, motor homes, trailers etc.

The present invention is, of course, in no way restricted to the specific disclosure of the specification and drawings, but also encompasses any modifications within the scope of the appended claims.

We claim:

1. A motor vehicle comprising:

a rigid vehicle body structure comprising a compartment for passengers and payload, said vehicle body structure having a front, a back, and sides;

an exterior skin connected to said vehicle body structure, said exterior skin comprised of a plurality of aerial exterior skin portions;

at least one impact protection unit including moveable support elements connected to said vehicle body structure and to a first one of said aerial exterior skin portions for moving said first exterior skin portion from a retracted position at said vehicle body structure, when said motor vehicle is stationary, into an extended position, when said motor vehicle is moving, in which extended position a base surface area defined by an outer contour of said motor vehicle is enlarged;

wherein said impact protection unit upon impact reduces a deceleration of said compartment due to a movement of said impact protection unit toward said vehicle body structure;

wherein said first aerial exterior skin portion has a rigid structure so as to form a protective shield;

wherein a first set of said moveable support elements is arranged at an upper end of said first aerial skin portion and wherein a second set of said moveable support elements is arranged at a lower end of said first aerial skin portion;

wherein in said extended position said upper end of said first aerial exterior skin portion is moved away from said vehicle body structure by said first set of support elements and said lower end of said first aerial exterior skin portion is moved away from said vehicle body structure by said second set of said support elements.

2. A motor vehicle according to claim 1, wherein in said retracted position the base surface area of said motor vehicle is substantially identical to a floor area of said compartment.

3. A motor vehicle according to claim 1, wherein a second one of said aerial exterior skin portions is an exterior door panel and has connected thereto one of said impact protection units.

4. A motor vehicle according to claim 3, wherein a third one of said aerial exterior skin portions is an exterior side panel and has connected thereto one of said impact protection units.

5. A motor vehicle according to claim 4, wherein a fourth one of said aerial exterior skin portions includes at least a portion of a rear panel of said exterior skin and has connected thereto one of said impact protection units.

6. A motor vehicle according to claim 1, wherein said first set of said support elements are moveable stays connected to a stiff part of said vehicle body structure.

7. A motor vehicle according to claim 1, wherein said lower end of said first aerial exterior skin portion is guided so as to be linearly moveable.

8. A motor vehicle according to claim 1, wherein said impact protection unit comprises:

a first air bag positioned between said first aerial exterior skin portion and said vehicle body structure, wherein said first air bag compensates at least a portion of an impact energy; and a second air bag arranged inside said compartment and connected to said first air bag, wherein upon impact air from said first air bag is transferred to said second air bag.

9. A motor vehicle according to claim 8, wherein a pressure within said first air bag when inflated is adjustable.

10. A motor vehicle according to claim 8, wherein said first air bag comprises a plurality of air chambers each having a valve connected thereto, wherein each one of said valves responds to a different opening pressure.

11. A motor vehicle according to claim 10, wherein said means for inflating and deflating comprises a pressure source for inflating said first air bag and wherein said air chambers are connected with said valves to said pressure source, said pressure source comprising a pressure control device for controlling said valves.

12. A motor vehicle according to claim 1, wherein said first aerial exterior skin portion has a peripheral flange and wherein said vehicle body structure has a matching flange cooperating with said peripheral flange such that in said retracted position said peripheral flange overlaps said matching flange.

13. A motor vehicle according to claim 1, wherein said vehicle body structure is comprised of:

a driven base module including a drive unit and having an upper side forming a floor area of said compartment, said driven base module further including a roll bar;

at least one impact protection module at a front end of said driven base module and comprising said impact protection unit; and a superstructure module connected to said driven base module.

14. A motor vehicle according to claim 1, comprising a seat positioned in said compartment, wherein said seat comprises an elastic device connected to said seat for biasing said seat into a rearward position, wherein said seat, upon frontal impact on an obstacle, is displaced by a preset travel path in a forward direction.

15. A motor vehicle according to claim 14, wherein said seat comprises a seat belt and wherein said seat belt allows forward movement of a person seated in said seat by a preset travel path upon impact.

16. A motor vehicle according to claim 1, wherein said protective shield includes a front bumper and at least a major portion of said protective shield extends from the bumper to a lower edge of a windshield of the motor vehicle.

* * * * *